(12) United States Patent
Chang et al.

(10) Patent No.: US 8,085,983 B2
(45) Date of Patent: Dec. 27, 2011

(54) METHOD OF ADJUSTING SELECTED WINDOW SIZE OF IMAGE OBJECT

(75) Inventors: Yin-Pin Chang, Taipei (TW);
Tai-Chang Yang, Fongshan (TW);
Hong-Long Chou, Taipei (TW)

(73) Assignee: Altek Corporation, Hsinchu (TW)

( * ) Notice: Subject to any disclaimer, the term of this patent is extended or adjusted under 35 U.S.C. 154(b) by 572 days.

(21) Appl. No.: 12/344,796

(22) Filed: Dec. 29, 2008

(65) Prior Publication Data

US 2009/0169054 A1 Jul. 2, 2009

(30) Foreign Application Priority Data

Dec. 26, 2007 (TW) ................................ 96150366 A (51) Int. Cl.
*G06K 9/00* (2006.01)
(52) U.S. Cl. ........................................ 382/103; 348/169
(58) Field of Classification Search .................... 348/169
See application file for complete search history.

(56) References Cited

U.S. PATENT DOCUMENTS

| | | | | |
|---|---|---|---|---|
| 3,736,376 A * | 5/1973 | Kato, Jr. | ................... | 348/170 |
| 4,316,218 A * | 2/1982 | Gay | ................... | 348/169 |
| 4,845,500 A * | 7/1989 | Cornett et al. | ................... | 342/90 |
| RE34,615 E * | 5/1994 | Freeman | ................... | 348/95 |
| 5,341,142 A * | 8/1994 | Reis et al. | ................... | 342/64 |
| 5,381,173 A * | 1/1995 | Asayama | ................... | 348/170 |
| 6,154,558 A * | 11/2000 | Hsieh | ................... | 382/103 |
| 6,332,038 B1 * | 12/2001 | Funayama et al. | ................... | 382/190 |
| 6,466,693 B1 * | 10/2002 | Otsu et al. | ................... | 382/176 |
| 6,993,158 B2 * | 1/2006 | Cho et al. | ................... | 382/103 |
| 7,058,399 B2 * | 6/2006 | Klein et al. | ................... | 455/424 |
| 7,283,668 B2 * | 10/2007 | Moon et al. | ................... | 382/168 |
| 7,839,831 B2 * | 11/2010 | Vrcelj et al. | ................... | 370/337 |
| 7,899,245 B2 * | 3/2011 | Olson | ................... | 382/173 |
| 2003/0210330 A1 * | 11/2003 | Wiseman | ................... | 348/172 |
| 2005/0094140 A1 * | 5/2005 | Takeuchi | ................... | 356/335 |
| 2006/0291693 A1 * | 12/2006 | Olson et al. | ................... | 382/103 |
| 2007/0009065 A1 * | 1/2007 | Kuo et al. | ................... | 375/316 |
| 2008/0136628 A1 * | 6/2008 | Ishii | ................... | 340/540 |
| 2010/0315431 A1 * | 12/2010 | Smith et al. | ................... | 345/619 |

* cited by examiner

*Primary Examiner* — Jingge Wu
*Assistant Examiner* — Avinash J Yentrapati
(74) *Attorney, Agent, or Firm* — Workman Nydegger (57) ABSTRACT

A method of adjusting selected window size of an image object is applicable for tracking a target object in a video. The video includes a plurality of frames, and the target object has a display range changing with the playback of each frame. According to a variation trend of the display range of the target object, whether a variation times corresponding to the variation trend reaches a threshold value or not is recorded, and then the selected window size is reset, such that the target object is enclosed with a selected window having a size closer to the target object.

5 Claims, 7 Drawing Sheets

METHOD OF ADJUSTING SELECTED WINDOW SIZE OF IMAGE OBJECT

CROSS-REFERENCE TO RELATED APPLICATIONS

This non-provisional application claims priority under 35 U.S.C. §119(a) on Patent Application No(s). 096150366 filed in Taiwan, R.O.C. on Dec. 26, 2007 the entire contents of which are hereby incorporated by reference.

BACKGROUND OF THE INVENTION

1. Field of Invention

The present invention relates to a method of adjusting selected window size of an image object, and more particularly to a method used in consecutive image frames having a target object for automatically adjusting selected window size of the image object according to size variation of the target object in the image frames.

2. Related Art

Nowadays when the multimedia information is developed, in order to recognize the content or object in the video, techniques for detecting and tracking the object are commonly used. For example, the detection on human faces or the enclosing on car number-plates in the security system require for the correct enclosing of the target object.

The conventional method for capturing the target object in the video includes using an image selected window having a fixed size to enclose the target object, and the size of the selected window is optimally closest to the size of the target object. Generally speaking, the target object in various frames usually changes in size as time passes. For example, the close-up lens or far-away lens may change the displaying size of the target object in the frame. If the selected window having a fixed size is used to enclose the target object, when the size of the target object is larger or smaller than the selected window, the feature values of the target object captured by the selected window may be different in the subsequent application, thus causing an error in the calculation result.

Therefore, a variable selected window is also proposed to be applied on a varying target object. If the selected window is adjusted to the corresponding size of the target object in each frame, the calculation load of a calculation unit may be increased, and the size of the selected window may be varied severely. For example, in a common video, the variation of target object may often be incorrectly determined by the computer due to the influence of light or background, such that the enclosing range of the selected window may be changed significantly.

SUMMARY OF THE INVENTION

In view of the above problems, the present invention is directed to a method of adjusting selected window size of an image object.

As embodied and broadly described herein, the method of adjusting selected window size of an image object disclosed in the present invention is applicable for tracking a target object in a video. The video includes a plurality of frames, and a display range of the target object varies along with the playback of each frame.

According to an embodiment of the present invention, the method of adjusting selected window size of an image object of the present invention includes the following steps. A reference selected window, a small sized selected window, a large sized selected window, and a variation condition are initialized. A comparison means is provided for comparing the display range variation of the target object in the present round Roundn and includes the following steps. Two adjacent frames are selected sequentially as a first selected frame and a second selected frame, and the target object in the first selected frame and the second selected frame are enclosed respectively with the selected windows. Coverage ranges of the selected windows for enclosing the target object are calculated to obtain a calculation result, and the variation condition corresponding to the reference selected window is set according to the calculation result. The variation condition is used for recording a variation trend of the display range of the target object. If the variation condition of the present round Roundn is the same as that of the previous round Roundn−1, a variation times is accumulated. If the variation times reaches the threshold value, the enclosing range of the reference selected window of the next round Roundn+1 is adjusted through the variation condition.

The present invention uses a plurality of selected windows for dynamically adjusting the selected window of the object in the video. As for the enclosing of the image object, the calculation complexity may be effectively lowered, and an enclosing window may perform the enclosing more smoothly without a large scale of enclosing range variation.

Features and embodiments of the present invention are illustrated as an optimal embodiment with reference to the drawings.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The present invention is directed to a method of adjusting selected window size of an image object, which is applicable for tracking a target object in the video. The video is constituted by a plurality of frames, and includes at least one object, such as human face, vehicle, animal or article.

Figure 1A:
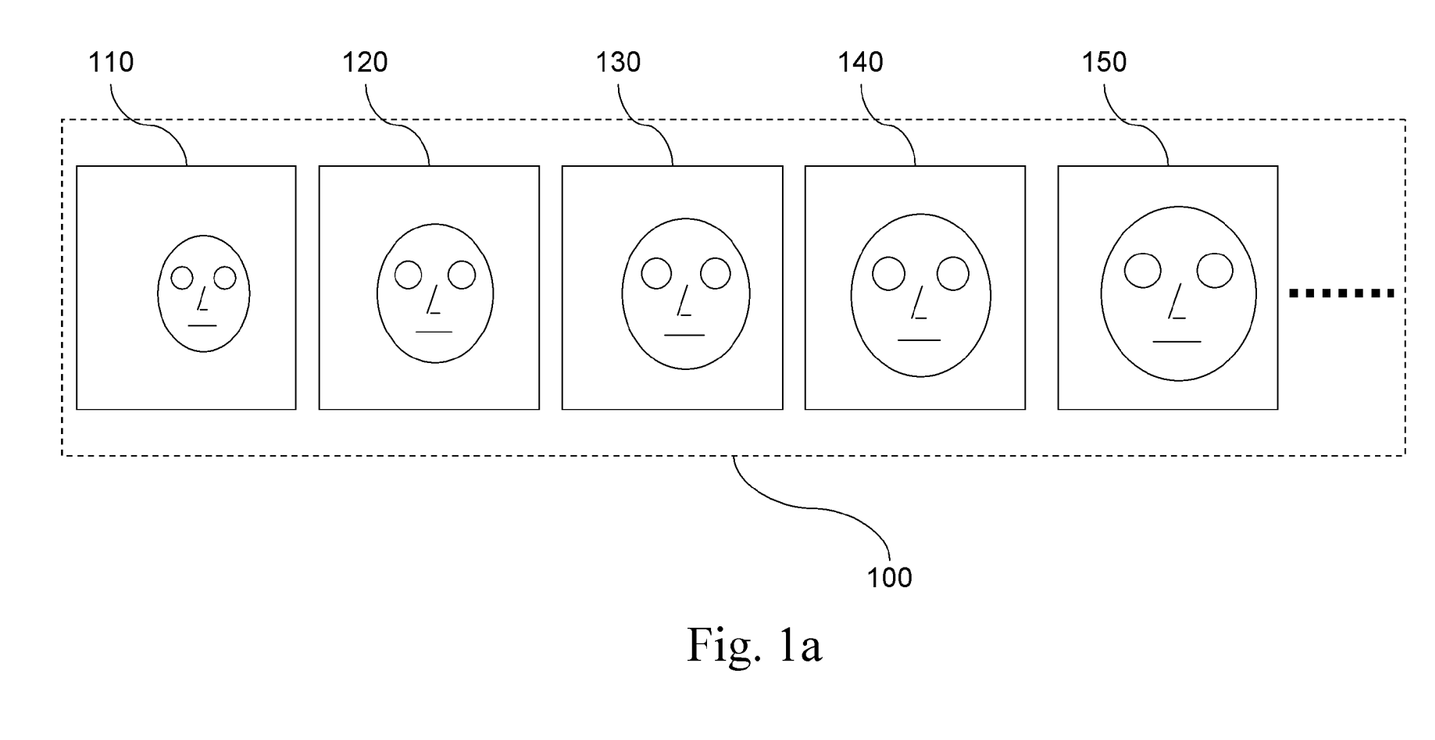
FIG. 1a is a schematic view showing a target object variation of each frame in the video.
Figure 1B:
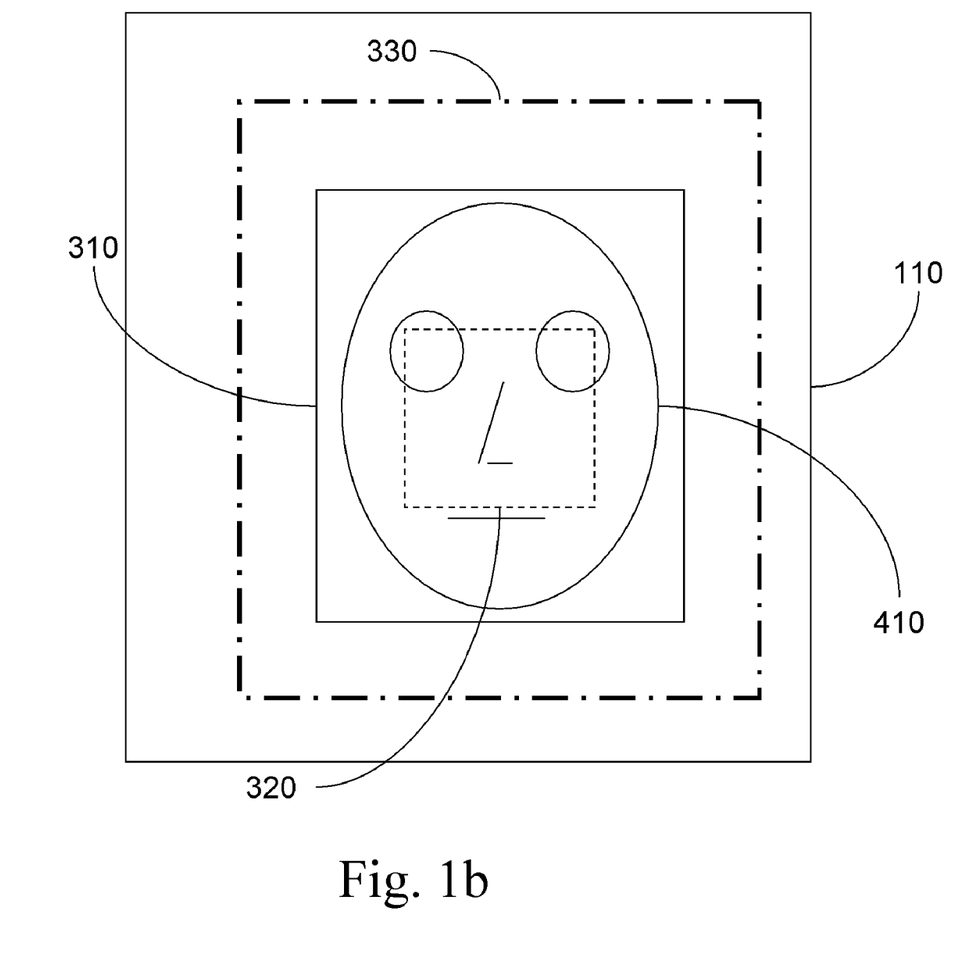
FIG. 1b is a schematic view showing the target object and each selected window in a frame.

Referring to FIG. 1a and FIG. 1b, schematic views of a target object variation of each frame in the video and each selected window are respectively shown. The video 100 in FIG. 1a has a plurality of frames 110-150. FIG. 1b takes the first frame in the video 100 as an example, and FIG. 1b shows the frame 110, a reference selected window 310, a small sized selected window 320, a large sized selected window 330, and a target object 410. One target object 410 is defined in this embodiment as an object specifically selected in this embodiment. A display range of the target object 410 may has a size or position varied with the playback of each frame 110-150.

For example, during the traveling of a vehicle in the video or in a close-up view for a human being, the display size of the target object 410 varies.

Figure 2:
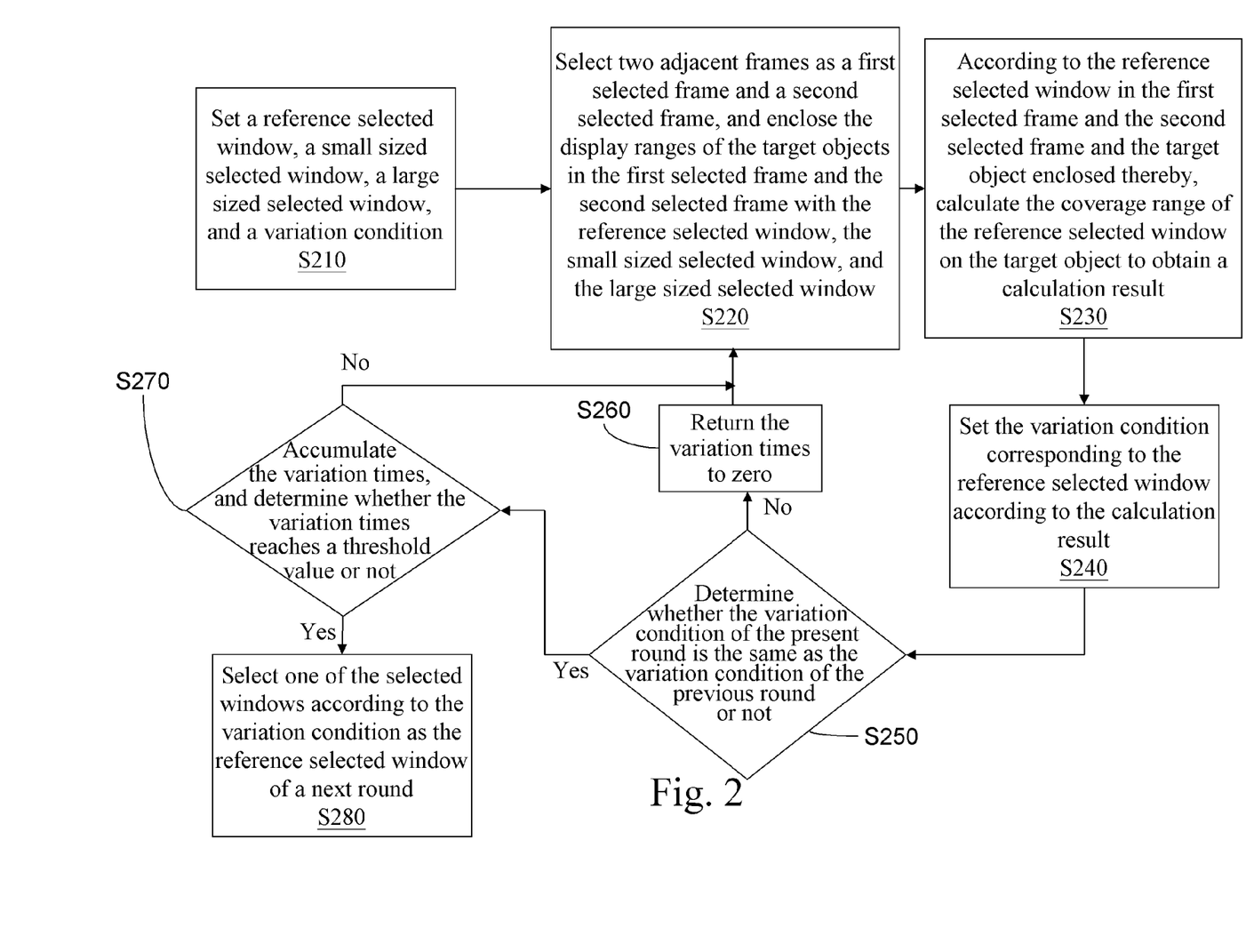
FIG. 2 is a schematic view of an operation process according to this embodiment.

The method of adjusting selected window size of an image object provided by the present invention is also shown in FIG. 2, which includes the following steps. First of all, a reference selected window, a small sized selected window, a large sized selected window, and a variation condition are set (Step S210). The small sized selected window 320 has a smaller range than the reference selected window 310, and the large sized selected window 330 has a larger range than the reference selected window 310.

In each round $Round_n$, two adjacent frames are selected as a first selected frame and a second selected frame, and the display ranges of the target objects in the first selected frame and the second selected frame are enclosed with the reference selected window, the small sized selected window, and the large sized selected window (Step S220). In order to clearly illustrate each comparison process of the present invention, the relevant process of calculating the first selected frame 180 and the second selected frame 190 is referred to as a Round.

In this embodiment, the video is played forwardly, and thus the first selected frame 180 and the second selected frame 190 are played forwardly. For example, the frames 110-150 in FIG. 1a are played in the sequence of frame 110, frame 120, frame 130, frame 140, and frame 150, and thus the first selected frame 180 and the second selected frame 190 are selected firstly from the frame 110 and the frame 120. If the frames are played backwardly, the first selected frame 180 and the second selected frame 190 are selected backwardly.

According to the reference selected window in the first selected frame and the second selected frame and the target object enclosed thereby, the coverage range of the reference selected window on the target object is calculated to obtain a calculation result (Step S230). The variation condition corresponding to the reference selected window is set according to the calculation result (Step S240).

The method of calculating the coverage range of the reference selected window 310 on the target object 410 is based on, but not limited to, various physical values in space domain in the coverage range. For example, color display ratio or brightness of the reference selected window 310 on the target object 410 is used for identifying the coverage range of the reference selected window 310 on the target object 410. Moreover, the variation condition is a variation relationship of the coverage range of the reference selected window 310 on the target object 410. When the display range of the target object 410 in the reference selected window 310 is enlarged, the variation condition is set as "enlarged", and vice versa. In order to facilitate the illustration, oral expression is used to set the variation condition. As for the program design, the variation condition may be set as a variable for determination.

Whether the variation condition of the present round $Round_n$ is the same as the variation condition of the previous round $Round_{n-1}$ or not is determined (Step S250). If the variation condition of the present round $Round_n$ is different from the variation condition of the previous round $Round_{n-1}$, the variation times is returned to zero (Step S260). If the variation condition of the present round $Round_n$ is the same as the variation condition of the previous round $Round_{n-1}$, the variation times is accumulated, and whether the variation times reaches a threshold value or not is determined (Step S270). If the variation times does not reach the threshold value, the Step S220 is repeated. If the variation times reaches the threshold value, one of the selected windows is selected according to the variation condition as the reference selected window 310 of a next round $Round_{n+1}$, and the Step S210 is repeated (Step S280).

It should be specially noted that, the present invention decides the size of the reference selected window 310 of the next round $Round_{n-1}$ according to the variation condition. If the variation condition is "enlarged", the large sized selected window 330 of the present round is set as the reference selected window 310 of the next round $Round_{n+1}$, and a new range of the large sized selected window 330 is re-calculated according to a certain ratio. If the variation condition is "shrunk", the small sized selected window 320 of the present round $Round_n$ is set as the reference selected window 310 of the next round $Round_{n+1}$, and a new range of the small sized selected window 320 is re-calculated according to a certain ratio. If the variation condition is "unchanged", the reference selected window 310 of the present round $Round_n$ is set as the reference selected window 310 of the next round $Round_{n+1}$.

In order to clearly illustrate the steps of this embodiment, herein an embodiment is illustrated in detail. Firstly, in FIG. 1b, the reference selected window 310, the small sized selected window 320, the large sized selected window 330, and the variation condition are respectively initialized (corresponding to Step S210). In each round $Round_n$, two adjacent frames are selected sequentially from FIG. 1a as the first selected frame 180 and the second selected frame 190 (corresponding to Step S220).

According to the reference selected window 310 in the first selected frame 180 and the second selected frame 190 and the target object 410 enclosed thereby, the coverage range of the reference selected window 310 on the target object 410 is calculated to obtain a calculation result. The variation condition corresponding to the reference selected window 310 is set according to the calculation result (corresponding to Steps S230-S240).

Referring to FIGS. 3a-3d, schematic views of the size variation of the target object 410 in different frames in different rounds are shown. In each round in FIGS. 3a-3c, the reference selected window 310, the small sized selected window 320, and the large sized selected window 330 are respectively used to enclose the first selected frame 180 and the second selected frame 190.

Figure 3A:
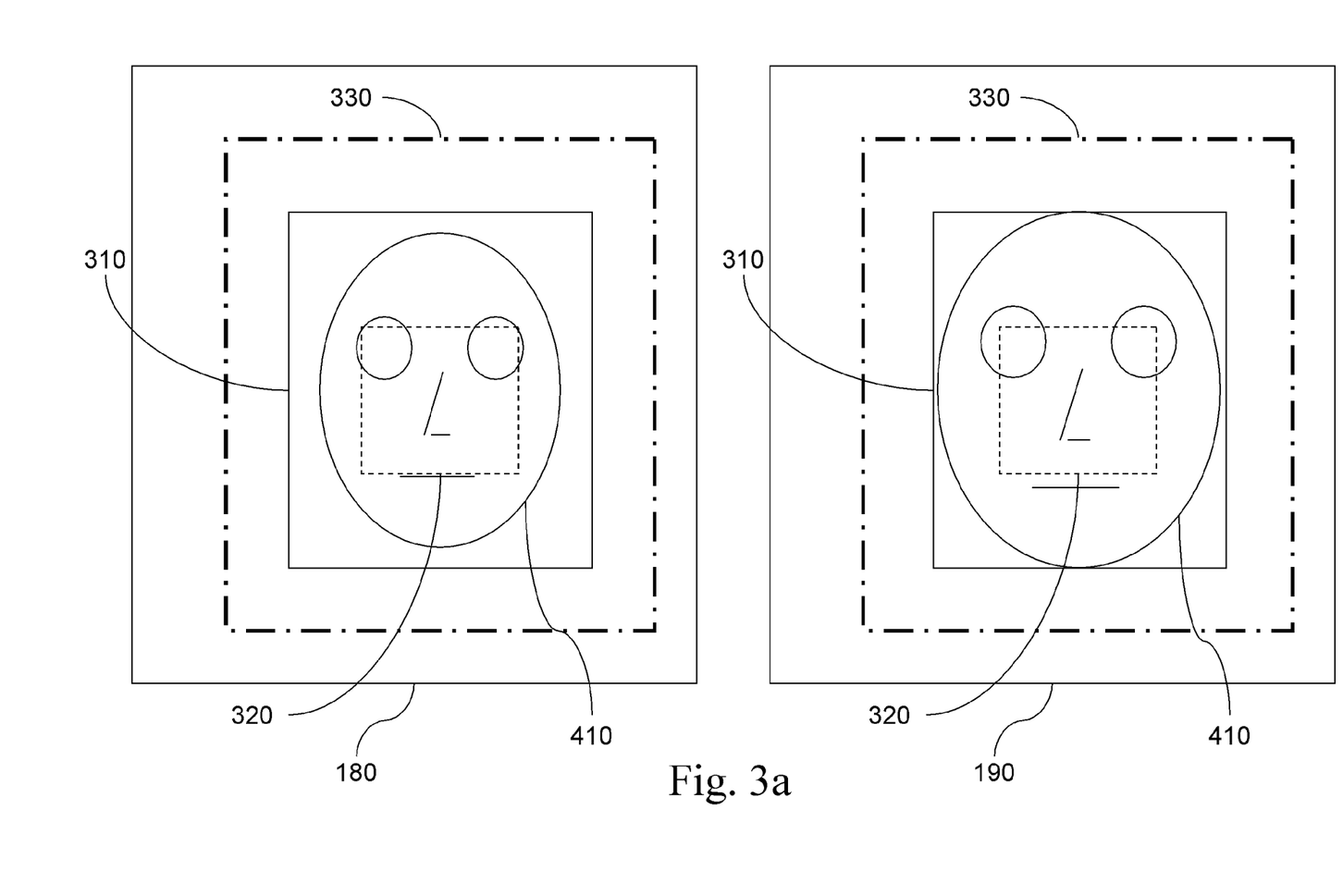
FIG. 3a is a schematic view of the target object and an enclosed window in a first round.

At the left of FIG. 3a is the first selected frame 180, and in FIG. 3a, the frame 110 in FIG. 1a is selected as the first selected frame 180 in the present round. At the right of FIG. 3a is the second selected frame 190, and in FIG. 3a, the frame 120 in FIG. 1a is selected as the second selected frame 190 in the present round.

Figure 3B:
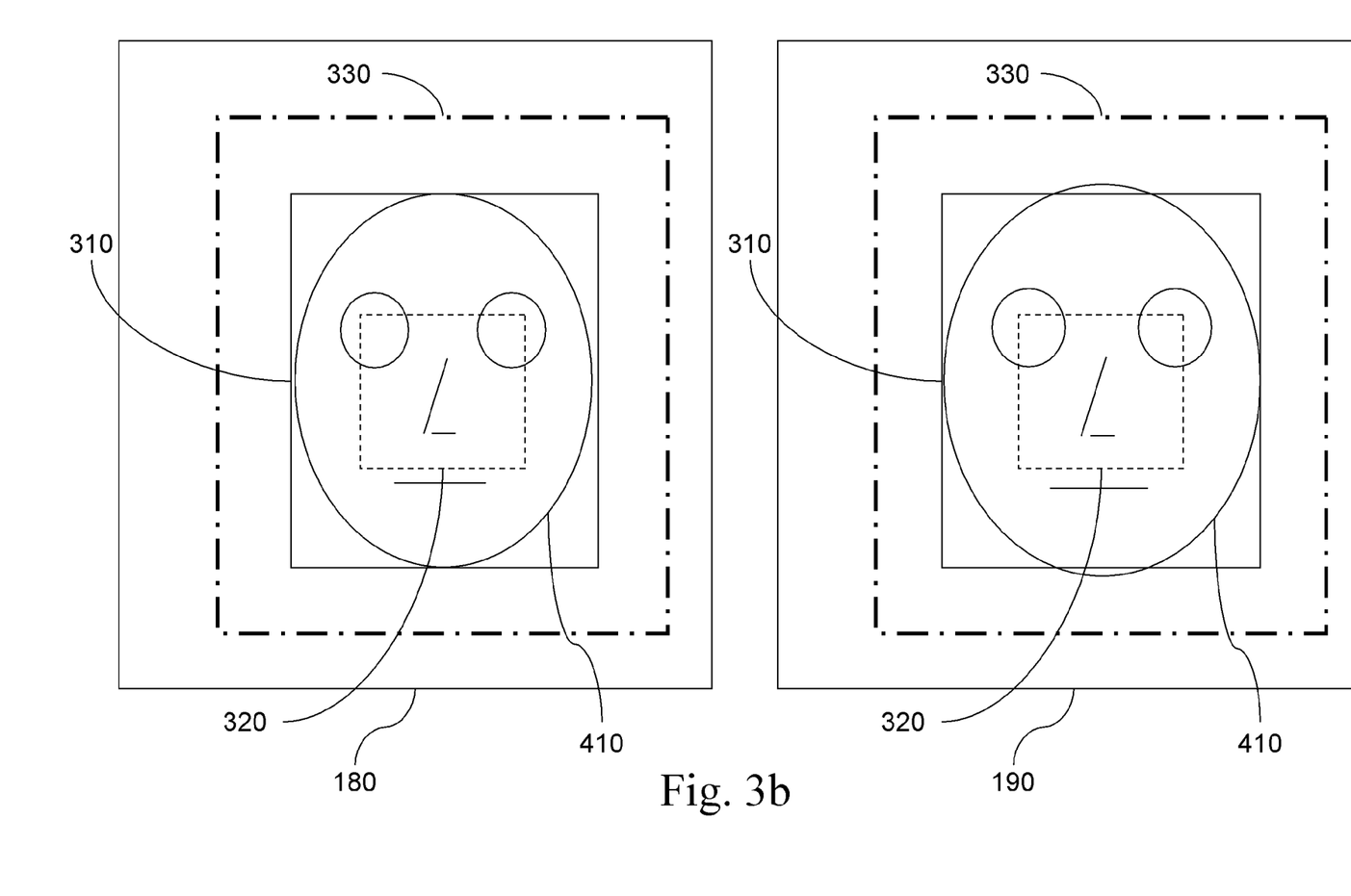
FIG. 3b is a schematic view of the target object and an enclosed window in a second round.

Furthermore, at the left of FIG. 3b is the first selected frame 180, and in FIG. 3b, the frame 120 in FIG. 1a is selected as the first selected frame 180 in the present round. At the right of FIG. 3a is the second selected frame 190, and in FIG. 3b, the frame 130 in FIG. 1a is selected as the second selected frame 190 in the present round.

Figure 3C:
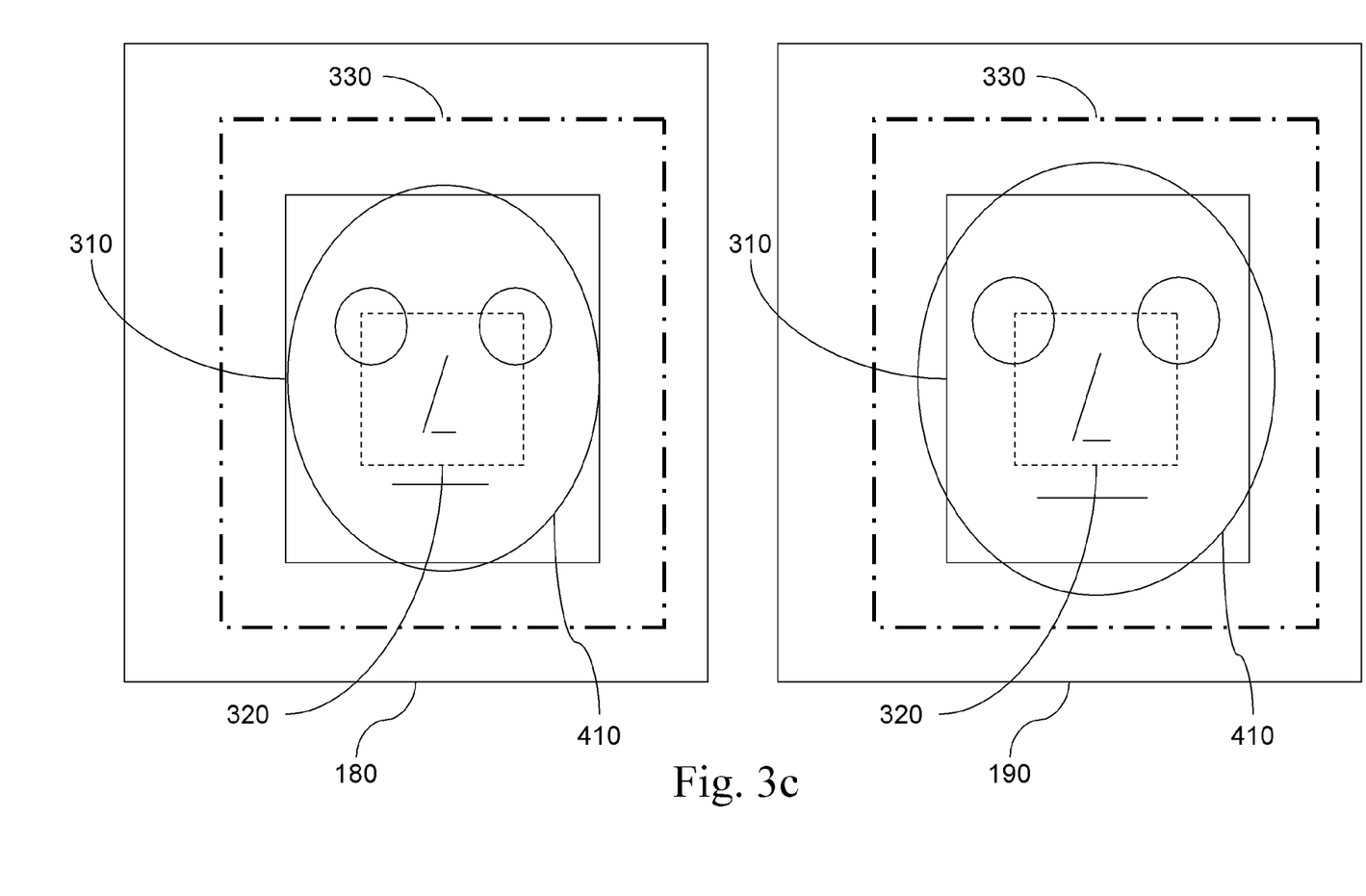
FIG. 3c is a schematic view of the target object and an enclosed window in a third round.

It can be deduced that, the first selected frame 180 in FIG. 3c is the frame 130, and the second selected frame 190 is the frame 140. The first selected frame 180 in FIG. 3d is the frame 140, and the second selected frame 190 is the frame 150.

It is obviously found from FIGS. 3a-3d that, the target object 410 is gradually enlarged, and thus the variation condition in the present round in FIG. 3a is set as "enlarged". Likewise, the variation condition in the present round in FIG. 3b is also set as "enlarged", and thus the variation condition in the present round in FIG. 3a is the same as that in FIG. 3b, thereby the variation times is accumulated by 1. The above step proceeds, and if FIG. 3b and FIG. 3c have the same variation condition, the variation times is further accumulated (corresponding to Step S250).

When the variation times is accumulated to reach a threshold value, one of the selected windows is selected according to the variation condition as the reference selected window 310 of the next round. FIG. 3d is a schematic view of varying the reference selected window 310 of the next round. In this embodiment, if the threshold value is assumed to be three, the variation condition in FIG. 3c is the same as that in FIG. 3d, thus the variation times is accumulated to reach the threshold value. Thereby, the size ranges of the reference selected window 310, the small sized selected window 320, and the large sized selected window 330 of the second selected frame 190 in FIG. 3d are reset (corresponding to Step S280).

Figure 3D:
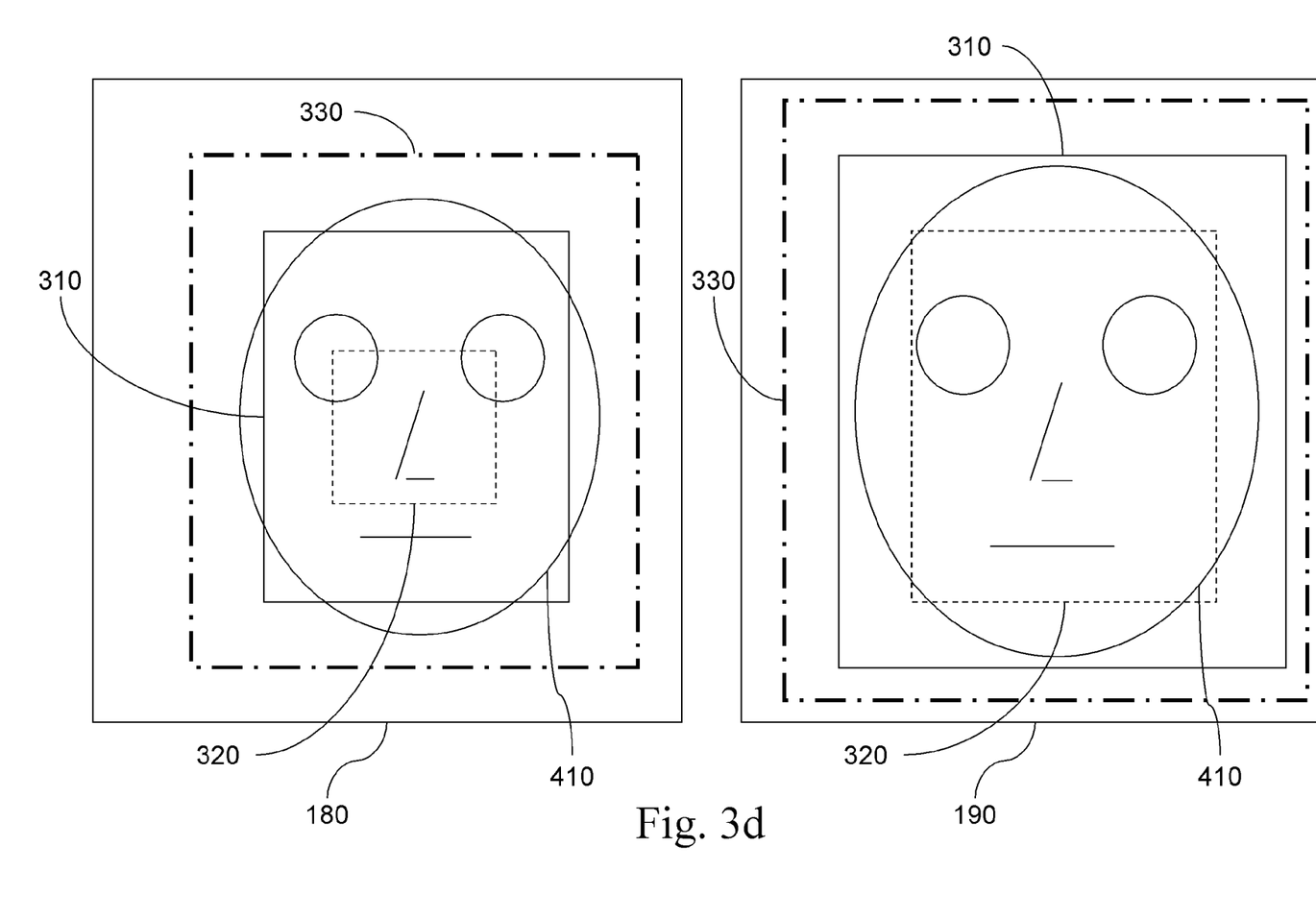
FIG. 3d is a schematic view of the target object and an enclosed window in a fourth round.

In the present round in FIG. 3d, since the variation times reaches the threshold value, the ranges of the reference selected window 310 and other selected windows of the second selected frame 190 are re-adjusted according to the previous variation condition and selected windows. In other words, the variation conditions in the round in FIGS. 3a, 3b, 3c, and 3d are all "enlarged", and thus the reference selected window 310 of the second selected frame 190 in FIG. 3d is changed into the large sized selected window 330 of the first selected frame 180 in FIG. 3d. Likewise, if the variation conditions in the round in FIGS. 3a, 3b, 3c, and 3d are all "shrunk", the reference selected window 310 of the second selected frame 190 in FIG. 3d is changed into the small sized selected window 320 of the first selected frame 180 in FIG. 3d. The above step of changing selected window can not only be accomplished in the same round, but also in the next round.

The present invention utilizes a plurality of selected windows to dynamically adjust the size of the selected window for the object in the video. Thereby, as for the enclosing of the image object, the calculation complexity may be effectively reduced, and an enclosing window may perform the enclosing more smoothly without large enclosing range variation.

What is claimed is:

1. A method of adjusting selected window size of an image object, applicable for tracking a target object in a video, comprising:
    setting a reference selected window and a variation condition; and
    providing a comparison means, for comparing a display range variation of the target object, the comparison means further comprising:
        selecting two adjacent frames sequentially as a first selected frame and a second selected frame, and enclosing the target object in the first selected frame and the second selected frame respectively with the reference selected window;
        calculating a coverage range of the reference selected window for enclosing the target object to obtain a calculation result, and setting the variation condition corresponding to the reference selected window according to the calculation result, wherein the variation condition is used for recording a variation trend of the display range of the target object.
    if the variation condition generated by the first selected frame and a previous frame thereof is the same as the variation condition generated by the first selected frame and the second selected frame, accumulating a variation times; and
    if the variation times reaches a threshold value, adjusting an enclosing range of the reference selected window of the second selected frame through the variation condition.

2. The method of adjusting selected window size of an image object according to claim 1, wherein setting the reference selected window further comprises:
    setting a small sized selected window and a large sized selected window, wherein the small sized selected window has a range smaller than the reference selected window, and the large sized selected window has a range larger than the reference selected window.

3. The method of adjusting selected window size of an image object according to claim 1, wherein if the variation condition generated by the first selected frame and the previous frame thereof is different from the variation condition generated by the first selected frame and the second selected frame, the variation times is re-calculated.

4. The method of adjusting selected window size of an image object according to claim 1, wherein setting the range of the variation condition further comprises:
    comparing coverage ranges of the reference selected window for enclosing the target object respectively in the first selected frame and the second selected frame;
    if the coverage range of the reference selected window for enclosing the target object in the first selected frame is smaller than the coverage range of the reference selected window for enclosing the target object in the second selected frame, setting the variation condition as increased;
    if the coverage range of the reference selected window for enclosing the target object in the first selected frame equals to the coverage range of the reference selected window for enclosing the target object in the second selected frame, setting the variation condition as unchanged; and
    if the coverage range of the reference selected window for enclosing the target object in the first selected frame is larger than the coverage range of the reference selected window for enclosing the target object in the second selected frame, setting the variation condition as reduced.

5. The method of adjusting selected window size of an image object according to claim 1, wherein scaling the reference selected window further comprises:
    if the variation condition is increased and reaches the threshold value, taking the large sized selected window as the reference selected window of the second selected frame;
    if the variation condition is unchanged and reaches the threshold value, remaining the reference selected window of the second selected frame unchanged; and
    if the variation condition is reduced and reaches the threshold value, taking the small sized selected window as the reference selected window of the second selected frame.

* * * * *